United States Patent
Labayen De Inza et al.

(10) Patent No.: US 9,810,796 B2
(45) Date of Patent: Nov. 7, 2017

(54) METHOD FOR PRODUCING A SENSOR BOARD FOR A DETECTOR MODULE

(71) Applicant: Siemens Aktiengesellschaft, München (DE)

(72) Inventors: Miguel Labayen De Inza, Forchheim (DE); Jan Wrege, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/883,751

(22) Filed: Oct. 15, 2015

(65) Prior Publication Data

US 2016/0116610 A1    Apr. 28, 2016

(30) Foreign Application Priority Data

Oct. 27, 2014    (DE) .................. 10 2014 221 829

(51) Int. Cl.
*G01T 1/24* (2006.01)

(52) U.S. Cl.
CPC .................... *G01T 1/243* (2013.01)

(58) Field of Classification Search
CPC ....... G01T 1/2018; G01T 1/2928; G01T 1/24; G01T 1/241; G01T 1/243; G01T 1/247
See application file for complete search history.

(56) References Cited

U.S. PATENT DOCUMENTS

| | | | |
|---|---|---|---|
| 6,510,195 B1 * | 1/2003 | Chappo | G01T 1/2018 250/208.1 |
| 7,223,981 B1 * | 5/2007 | Capote | H01L 27/14634 250/370.13 |
| 7,439,516 B2 * | 10/2008 | Zeman | G01T 1/249 250/370.11 |
| 8,120,683 B1 | 2/2012 | Turner | |
| 2010/0276572 A1 * | 11/2010 | Iwabuchi | H01L 27/1464 250/208.1 |
| 2013/0032389 A1 * | 2/2013 | Tokura | G01T 1/2018 174/264 |
| 2013/0176552 A1 * | 7/2013 | Brown | H01L 27/14806 356/51 |
| 2015/0129999 A1 | 5/2015 | Cassidy et al. | |

FOREIGN PATENT DOCUMENTS

| | | |
|---|---|---|
| DE | 4310622 A1 | 10/1993 |
| EP | 2665096 A1 | 11/2013 |
| GB | 2265753 A | 10/1993 |

OTHER PUBLICATIONS

German Office Action dated Mar. 26, 2015.

* cited by examiner

*Primary Examiner* — Kiho Kim
(74) *Attorney, Agent, or Firm* — Harness, Dickey & Pierce P.L.C.

(57) ABSTRACT

A method is disclosed for producing a hybrid, incorporable into a sensor board, for a detector module including a plurality of reader units. An embodiment of the method includes positioning the reader units in a stacked construction, each on a common sensor layer. The method further includes, after all of the reader units are positioned, fixing the reader units together on the sensor layer, thereby forming the hybrid. An embodiment of the invention further relates to a detector module for an X-ray detector including a number of sensor boards arranged adjacent to one another on a module carrier. The sensor boards are produced by an embodiment of the method.

18 Claims, 3 Drawing Sheets

METHOD FOR PRODUCING A SENSOR BOARD FOR A DETECTOR MODULE

PRIORITY STATEMENT

The present application hereby claims priority under 35 U.S.C. §119 to German patent application number DE 102014221829.2 filed Oct. 27, 2014, the entire contents of which are hereby incorporated herein by reference.

FIELD

At least one embodiment of the invention generally relates to a method for producing a sensor board for a detector module. At least one embodiment of the invention further generally relates to a sensor board produced by a corresponding method, as well as a detector module comprising a number of sensor boards.

BACKGROUND

Within the context of high resolution imaging methods, such as for example in computer tomography in medical imaging, generally X-ray detectors are used in order to produce a three-dimensional image with a high resolution of an area of a patient to be examined.

An X-ray detector, the sensor layer thereof being configured as a directly converting semi-conductor layer, permits in this case a quantitative and energy-selective detection of individual X-ray quanta. With the incidence of X-ray radiation, electron hole pairs, i.e. pairs of negative and positive charge carriers, are produced in the sensor layer. By way of a voltage applied to the sensor layer and/or to the surface of the sensor layer, the charge carriers are separated and move toward the respective opposingly charged electrodes and/or surfaces of the sensor layer. The current thereby produced or a corresponding charge transfer may be evaluated by an electronic sensor unit connected downstream. For example semi-conductor materials in the form of CdTe, CdZnTe, CdTeSe, CdZnTeSe, CdMnTe, GaAs, Si or Ge which have a high absorption cross section for X-ray radiation are suitable for detecting the X-ray quanta.

Large-surface X-ray detectors are required, in particular, in computer tomography and to this end a plurality of relatively small detector modules are frequently arranged adjacent to one another. Such detector modules in turn consist of individual sensor boards which are arranged adjacent to one another with the smallest possible spacing (~100 µm) on a common carrier, the sensor layers thereof together forming the sensor surface of a detector module.

During the production of a sensor board it is usual to arrange a reader unit, such as for example an ASIC, in a stacked construction initially on a sensor layer and subsequently to fix the components to one another. This stacked construction is denoted as a hybrid.

Flip-chip technologies which are common in connection techniques may be used for producing a sensor board, small subassemblies being able to be manufactured rapidly thereby in a tightly packed manner. Here, the respective components to be connected to form a subassembly, i.e. in the present case the reader unit and the sensor layer, may be fixed together by way of an adhesive bonding method, for example.

Alternatively, fixing may take place by way of a soldering method. To this end, generally soldering elements from a low-melting solder material are used as contact or connecting elements ("bumps") by which the components to be connected are fastened together. In the production of a hybrid, such soldering elements are applied to the surface of the reader unit facing the sensor layer in the integrated state and the reader unit is then brought into contact with the sensor layer via the soldering elements. By a subsequent heating of the solder material which is generally carried out by specific temperature adjustment of the mounting tools used for positioning the components, the components are connected together. This is referred to as so-called reflow soldering. When producing a hybrid, at least two method steps have to be carried out for each reader unit to be fixed. This is a drawback in the case of a plurality of reader units for each sensor layer.

SUMMARY

A method is disclosed in an embodiment, by which a sensor board is able to be produced in a simple manner, ensuring its failure-free function relative to the usual methods and with a higher throughput in mass production.

A detector module is disclosed, in an embodiment with a number of correspondingly produced sensor boards.

An embodiment of a method is disclosed for producing a sensor board for a detector module, wherein a plurality of reader units is provided, wherein the reader units are positioned in a stacked construction, in each case on a common sensor layer, and wherein after all of the reader units have been positioned, the reader units are fastened together to the sensor layer, forming a hybrid.

An embodiment of the invention is directed to a detector module for an X-ray detector, comprising a number of sensor boards arranged adjacent to one another on a module carrier, wherein the sensor board or each sensor board is produced by an embodiment of the method described above.

Further preferred embodiments of the detector module are disclosed from the subclaims referring to the method. In this case, the advantages cited for the method may be transferred expediently to the detector module.

BRIEF DESCRIPTION OF THE DRAWINGS

Example embodiments of the invention are described in more detail hereinafter with reference to the drawings, in which.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

An embodiment of a method is disclosed for producing a sensor board for a detector module, wherein a plurality of reader units is provided, wherein the reader units are positioned in a stacked construction, in each case on a common sensor layer, and wherein after all of the reader units have been positioned, the reader units are fastened together to the sensor layer, forming a hybrid.

An embodiment of the invention is based on the fact that the use of a conventional soldering method for producing "classic" 1:1 hybrids with one reader unit per sensor layer is not difficult in principle. When producing multi-hybrids, i.e. hybrids which comprise a plurality of reader units per sensor layer, however, this method is only able to be carried out by accepting undesirably long production times, as the required method steps—i.e. the exact positioning of the incorporated reader units and the subsequent fixing to the sensor layer—have to be frequently repeated one after the other until each reader unit is securely fastened to the sensor layer.

An embodiment of the invention further takes into account that, in addition to the increased time expenditure, a hybrid produced during such a multi-step process is subjected to undesirable thermal and mechanical loads. Thus, for example, a reader unit which is already fixed to the sensor layer is heated again when a second reader unit is arranged and fixed. Such a further application of heat may have an undesired effect on, for example, the edge regions of the reader units which have already been arranged.

An embodiment of the invention thus recognizes that this problem may be surprisingly easily solved if, during the production of a sensor board, the required reader units are initially arranged in position on the sensor layer and only after all of the reader units have been positioned on the sensor layer are the reader units fixed simultaneously and, in particular, in a single process step onto the sensor layer, forming a hybrid.

In this manner, the process sequence when producing a hybrid, and in particular when producing a multi-hybrid, may be accelerated. Thus, for example, when producing a 1:4 hybrid the four reader units to be incorporated are initially all arranged on the corresponding sensor layer. The fastening of the reader units on the sensor layer then takes place in a common step. In this manner, the production time is considerably shortened relative to the previous conventional processes.

In this case, in particular, it is also possible to arrange all of the reader units in position on the sensor layer at the same time. Thus, for example, a mounting tool may be used in fully automated production sequences, the mounting tool being able to position all of the reader units in a common step on the sensor layer.

The fastening of the reader units on the sensor surface preferably takes place via soldering elements. The soldering elements are expediently arranged in each case on the contact surface of the reader units, so that the reader units are arranged on the sensor layer by way of the soldering elements and/or brought into contact therewith.

Particularly preferably, solder globules are used as soldering elements. Alternatively, soldering elements made of solder paste are applied by way of a printing process or a jet process. The use of solder paste has the advantage that it is adhesive and thus holds the components, i.e. the sensor layer and the respective number of incorporated reader units, directly on the paste during the mounting. Therefore, the reader units do not have to be separately glued thereon in order to be positioned. In particular, materials which melt at low temperatures ranging between 110° C. and 180° C. are suitable as solder materials. Preferably, soldering elements which contain a metal which has been selected from a group which contains indium (In), silver (Ag), tin (Sn), bismuth (Bi) and lead (Pb) are used. Further preferably, soldering elements which contain a metal alloy, which is selected from a group which contains InAg, SnIn, SnBi, SnBiAg, SnBiPb are used.

Expediently, the fastening of the reader units onto the sensor surface takes place by the heating and fusion of the soldering elements, i.e. by way of so-called reflow soldering. In this case, preferably the soldering elements of all of the reader units arranged on a sensor layer are simultaneously heated so that the fastening of all of the reader units to the sensor layer by way of the soldering elements takes place simultaneously in a common process step. Thus undesirable thermal and mechanical loading of the components may be prevented. Preferably a soldering furnace, a so-called reflow furnace, is used for the fusion.

When heating the soldering elements in the soldering furnace, all of the soldering elements are fused at the same time and, as a result, all of the incorporated reader units are also fastened to the sensor layer substantially simultaneously. Moreover, there is the possibility of producing a plurality of hybrids at the same time, by the fastening to the sensor layer which is carried out after the arrangement and/or positioning of the respective reader units taking place simultaneously in the case of a plurality of hybrids. To this end, a plurality of hybrids is expediently transported into the soldering furnace together. Such a method is advantageous, in particular, for industrial mass production.

Preferably, soldering elements which have a diameter ranging between 50 μm and 250 μm are used. This method, therefore, relates to high-precision soldering of the reader units on the sensor layer. Due to the small diameter there is the possibility of producing hybrids with reduced geometries relative to conventional hybrids.

Expediently, the reader units are positioned by way of a mounting tool. The mounting tool serves for the precise predetermined alignment of the reader units on the sensor surface. During the arrangement of the reader unit or each reader unit, the sensor layer is preferably held in a resting position by way of a mounting tool, so that the reader units may be arranged in the corresponding position. The mounting tool for the sensor layer is expediently arranged on the sensor surface of the sensor layer, i.e. in the stacked construction which is produced after the arrangement of the components on the contact surface remote from the arranged reader unit. Thus the soldering elements of the respective reader units may be brought into contact with the contact surface of the sensor layer.

By fastening the components to one another by heating the soldering elements in a corresponding soldering furnace, temperature adjustment of the mounting tools, as was necessary hitherto, may be dispensed with. Thus the positioning of the reader unit or of each reader unit may preferably also take place at ambient temperature, for example at the temperature prevailing in the production area.

After the reader unit or each reader unit has been fastened to the sensor layer, the hybrid is expediently applied to a carrier in the stacked construction and thus the desired sensor board is produced. Expediently, a ceramic carrier is used as a carrier, which may be used as an intermediate substrate for signal transmission from the reader unit to a corresponding module electronics unit, and serves for the discharge of heat produced in the sensor layer, in particular to a metal module carrier.

Preferably, a sensor layer is used which contains cadmium telluride (CdTe), cadmium zinc telluride (CdZnTe), cadmium zinc tellurium selenide (CdZnTeSe), cadmium tellurium selenide (CdTeSe), cadmium manganese telluride (CdMnTe), indium phosphide (InP), thallium bromide (TlBr2) or mercury iodide (HgI2). Such semi-conductor materials permit the direct conversion of the X-ray radiation incident thereon into an electrical signal and are commercially available and of good quality relative to the charge transport properties and homogeneity.

An embodiment of the invention is directed to a detector module for an X-ray detector, comprising a number of sensor boards arranged adjacent to one another on a module carrier, wherein the sensor board or each sensor board is produced by an embodiment of the method described above.

Expediently the detector module comprises a carrier, the sensor board or each sensor board being arranged thereon. The carrier of the detector module or each detector module is preferably connected in a stacked construction via the module carrier to a electronic sensor unit. Thus the data detected during an X-ray image recording, i.e. the electrical signals from the direct conversion of the X-ray radiation incident on a sensor surface, is immediately evaluated and processed further. To this end, the electronic sensor unit may be read, for example, using a corresponding evaluation routine.

Further preferred embodiments of the detector module are disclosed from the subclaims referring to the method. In this case, the advantages cited for the method may be transferred expediently to the detector module.

Figure 1:
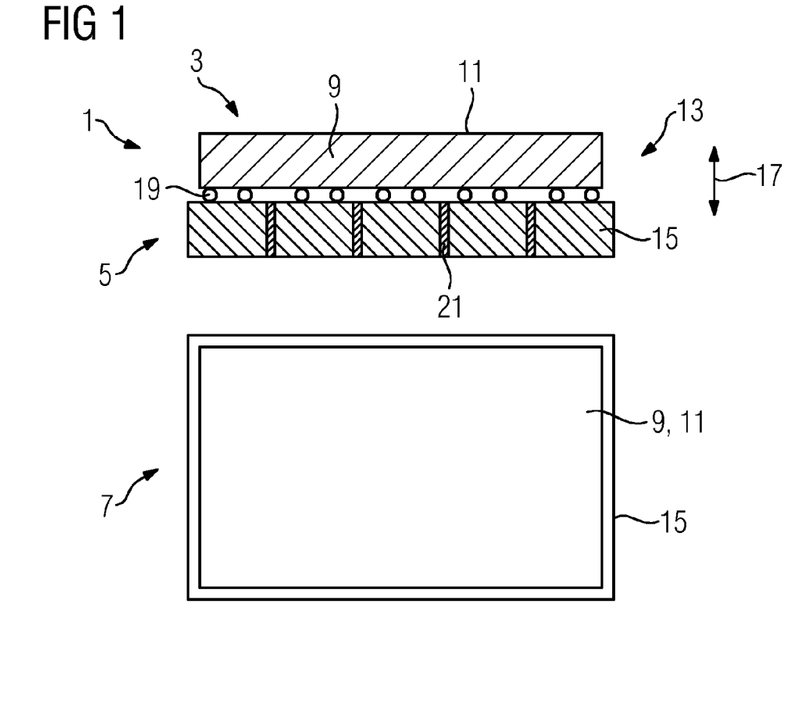
FIG. 1 shows a 1:1 hybrid in a side view and in a plan view.

FIG. 1 shows a 1:1 hybrid 3 which is able to be incorporated into a sensor board 1, in a side view 5 and in a plan view 7. The hybrid 3 comprises a sensor layer 9 with a sensor surface 11. The sensor layer 9 is arranged in a stacked construction 13 on a reader unit 15. The arrangement takes place by forming a spacing between the sensor layer 9 and the reader unit 15 in the direction of the stack 17.

Between the reader unit 15 and the sensor layer 9 solder globules 19 are arranged as soldering elements, the components 9, 15 being mounted on one another thereby. For the electrical contact of the sensor layer 9, through-contacts 21 (TSV, Through Silicon Vias) are incorporated in the reader unit 15.

Figure 2:
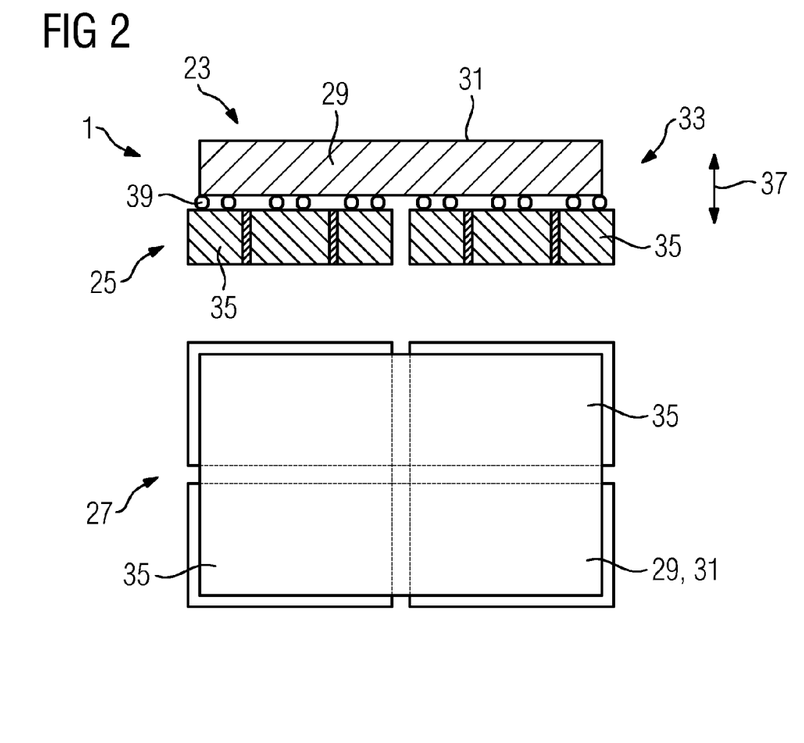
FIG. 2 shows a 1:4 hybrid in a side view and in a plan view.

FIG. 2 shows a further hybrid 23, in a side view 25 and in a plan view 27, which may be fitted in a sensor board 1. In the present case, this may be a 1:4 hybrid 23. The hybrid 23 comprises a sensor layer 31 configured with a sensor surface 29 which is arranged in a stacked construction 33 on four reader units 35 arranged adjacent to one another. The arrangement of the reader units 35 on the sensor layer 31 may be derived from the plan view 27. Also in this case, the fastening of the sensor layer 29 onto the reader units 35 takes place by solder globules 39 arranged therebetween in the direction of the stack 37.

The electrical contact of the sensor layer 29 is implemented via through-contacts 41 which are incorporated in the reader unit 35.

Both hybrids 1, 23 are able to be produced by way of a method which is described in more detail in the following description of FIGS. 3 to 5.

Figure 3:
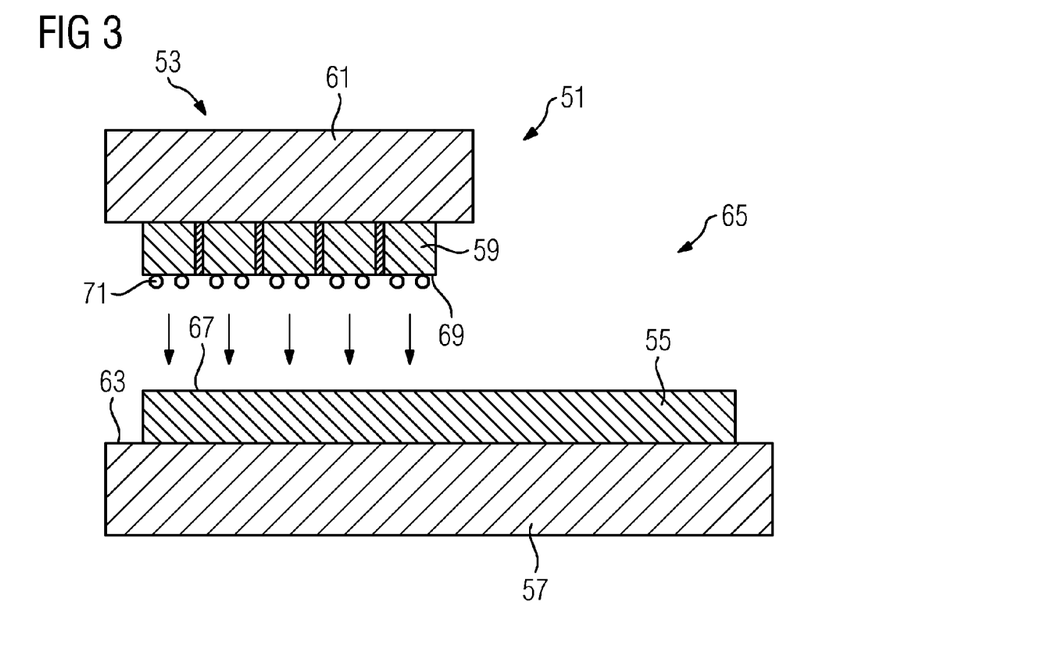
FIG. 3 shows the first process step when producing a hybrid for a sensor board.

In FIG. 3 the first process step 51 in the production of a 1:2 hybrid 53 is shown. In this case, initially a sensor layer 55 is provided, the sensor layer being retained by way of a mounting tool 57. A reader unit 59 is arranged on the sensor layer 55. The arrangement and/or positioning of the reader unit 59 also takes place by way of a mounting tool 61.

The mounting tool 57 which serves for retaining and/or positioning the sensor layer 55, is arranged in the present case on the sensor surface 63 of the sensor layer 55, i.e. on the side of the contact surface 67 remote from the arranged reader unit 59 in the stacked construction 65.

The reader unit 59 also comprises a contact surface 69, a plurality of soldering elements 71 being arranged thereon. The reader unit 59 is positioned on the sensor layer 55 by way of the mounting tool 61, 67. After positioning the reader unit 59, the mounting tool 61 is removed from the reader unit 59 and used for positioning a second reader unit 59.

Figure 4:
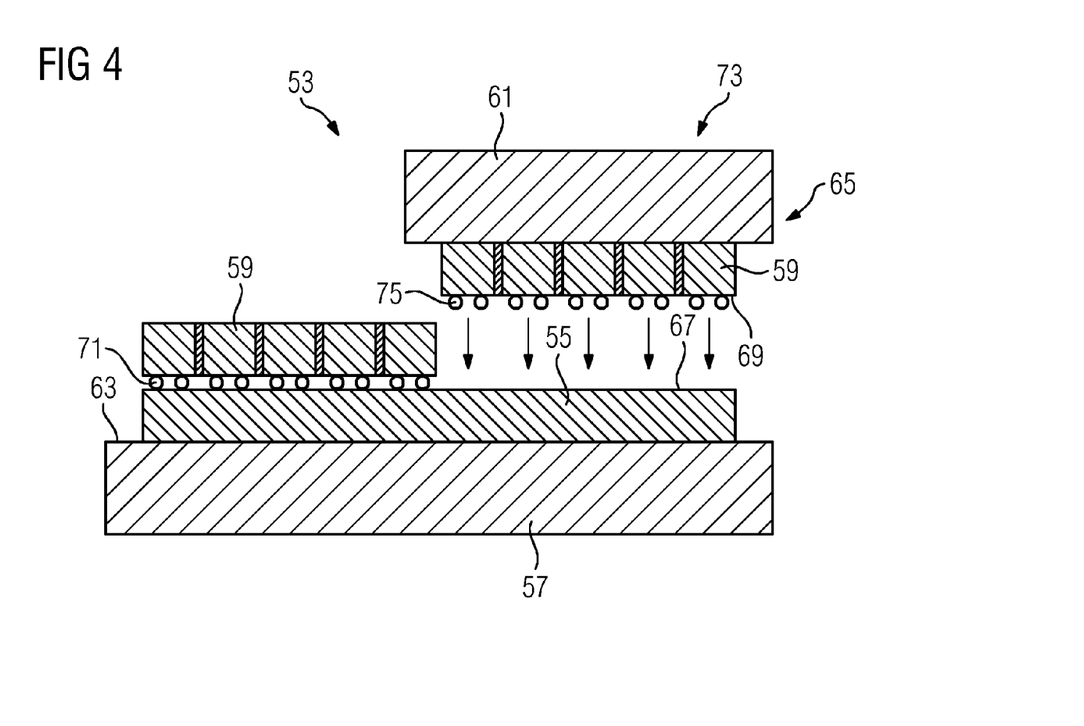
FIG. 4 shows the second process step when producing a hybrid for a sensor board.

In this case, the second reader unit 59 is positioned in a second process step 73 on the sensor layer 55 (FIG. 4). The reader unit 59 also has soldering elements 75 arranged on its contact surface 67. After the positioning has been completed, all of the reader units 59 used for producing the hybrid (in the present case two) are fastened to the sensor layer 55 by heating, forming the hybrid 53.

Figure 5:
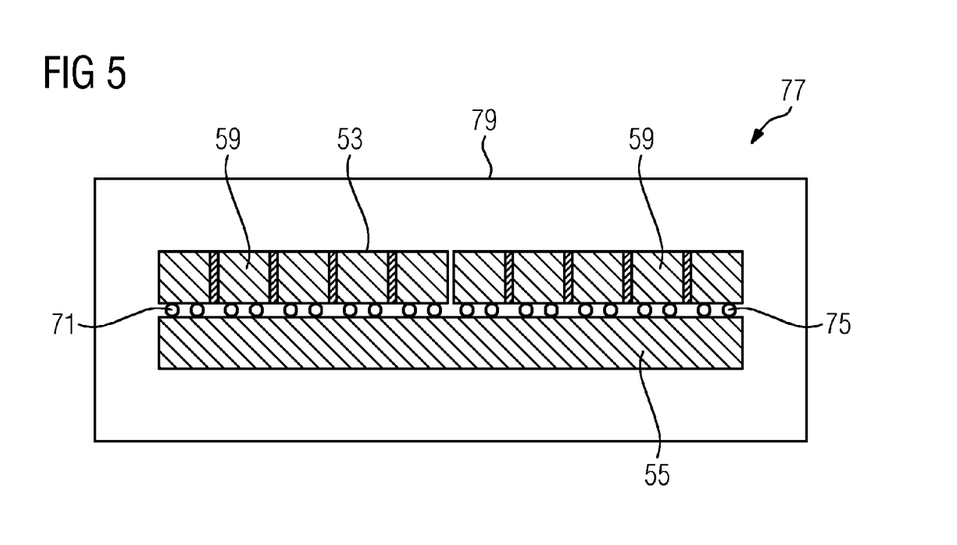
FIG. 5 shows the third process step when producing a hybrid for a sensor board.

This process step 77 which follows the positioning is shown in FIG. 5. The hybrid 53 is moved into a schematically shown soldering furnace 79, where the soldering furnace is heated to a soldering temperature of 150° C. Naturally the mounting tools 57, 61 which may be used immediately for retaining and positioning further reader units and/or sensor layers have been previously removed.

By heating in the soldering furnace, the soldering elements 75 are fused and during cooling a solid soldered connection is produced between the reader units 59 and the sensor layer 55. A correspondingly produced hybrid 53 may then be fitted in a detector module.

Figure 6:
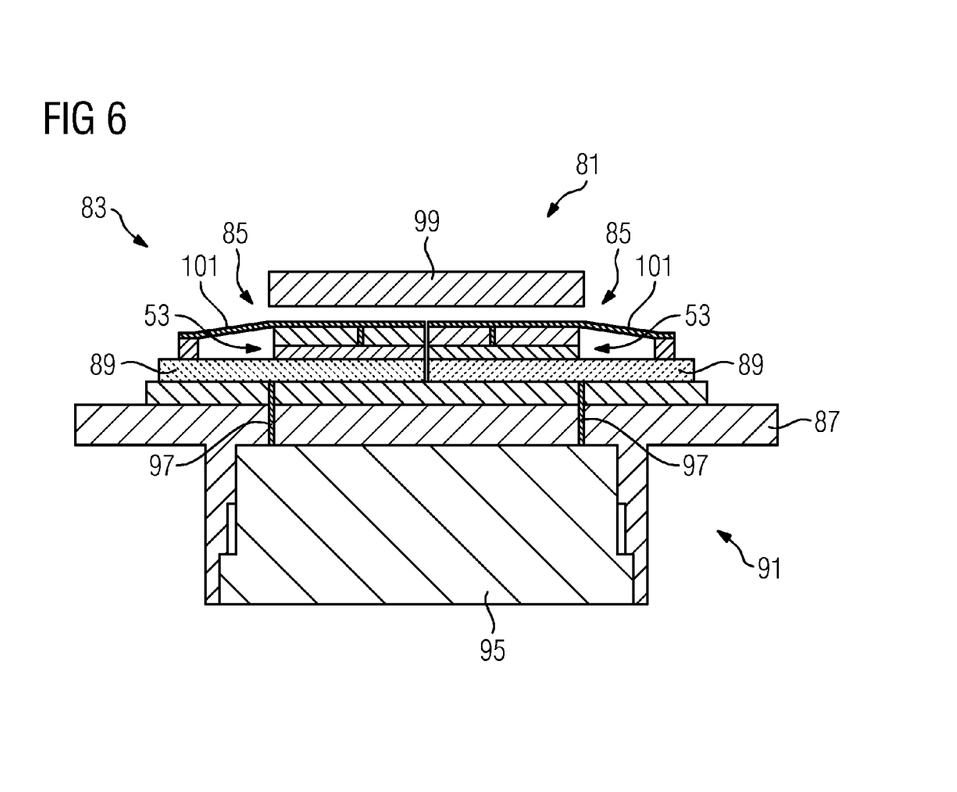
FIG. 6 shows a detector module with two sensor boards produced according to FIGS. 3 to 5.

Such a detector module 81 is shown in FIG. 6. The detector module 81 is shown as part of an X-ray detector 83 and has two sensor boards 85, which are arranged adjacent to one another on a common metal module carrier 87.

Both sensor boards 85 comprise in each case two hybrids 53 which in each case are arranged on a common carrier 89 configured as a ceramic carrier. The ceramic carrier 89 is connected to an electronic sensor unit 95 in the stacked construction 91 via the module carrier 87, data cables 97 extending therefrom to the respective sensor boards 85.

Additionally a collimator 99 is used in the form of a metal block covering the sensor surfaces 63, the collimator serving for producing a parallel beam path. For detecting X-ray radiation in the installed state inside an X-ray detector a high voltage is applied to the sensor surfaces 63 of the sensor layers 55 of the two sensor boards 85. The voltage is supplied in the present case via voltage supply lines 101, in each case conducting high voltage.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for producing a hybrid, incorporable into a sensor board, for a detector module including a plurality of reader units, the method comprising:
   positioning the plurality of reader units in a stacked construction, each of the plurality of reader units being in direct contact with a common sensor layer; and
   fastening, after all of the plurality of reader units are positioned, the plurality of reader units together directly to the common sensor layer using soldering elements, to thereby form the hybrid.

2. The method of claim 1, wherein the fastening of the reader units onto the common sensor layer comprises reflow soldering by fusion of the soldering elements.

3. The method of claim 2, wherein the soldering elements each include a diameter ranging between 50 μm and 250 μm.

4. The method of claim 3, further comprising:
   positioning the reader units on the common sensor layer via a mounting tool.

5. The method of claim 2, further comprising:
   positioning the reader units on the common sensor layer via a mounting tool.

6. The method of claim 1, wherein the soldering elements each include a diameter ranging between 50 μm and 250 μm.

7. The method of claim 6, further comprising:
   positioning the reader units on the common sensor layer via a mounting tool.

8. The method of claim 1, further comprising:
   positioning the reader units on the common sensor layer via a mounting tool.

9. The method of claim 1, wherein the hybrid is applied to a carrier in the stacked construction.

10. The method of claim 1, wherein the hybrid is a multi-hybrid.

11. The method of claim 1, further comprising: positioning the reader units one after another.

12. The method of claim 1, further comprising: positioning the reader units at the same time.

13. A detector module for an X-ray detector, comprising:
    a plurality of sensor boards arranged adjacent to one another on a module carrier, the plurality of sensor boards comprising
       a plurality of reader units in a stacked configuration, each of the plurality of reader units being in direct contact with a common sensor layer; and
       a plurality of unfused solder elements directly attached to each of the plurality of reader units and directly to the common sensor layer.

14. The detector module of claim 13, wherein the soldering elements fasten the reader units to the common sensor layer.

15. The detector module of claim 14, wherein the soldering elements each include a diameter ranging between 50 μm and 250 μm.

16. The detector module of claim 13, wherein the hybrid is a multi-hybrid.

17. The detector module of claim 13, wherein the reader units are positioned one after another.

18. The detector module of claim 13, wherein each of the solder elements comprises a temperature of between about 110 and 180 degrees Celsius.

* * * * *